Apr. 24, 1923.　　　　　　　　　　　　　　　　　1,453,031
W. R. UGGLA ET AL
TOOTHED WHEEL
Filed Feb. 21, 1921

Inventors
W. R. Uggla
G. A. F. Wallgren
By Marks & Clerk
Attys.

Patented Apr. 24, 1923.

1,453,031

UNITED STATES PATENT OFFICE.

WILHELM ROBERT UGGLA AND GUNNAR AUGUST FERDINAND WALLGREN, OF HARNOSAND, SWEDEN.

TOOTHED WHEEL.

Application filed February 21, 1921. Serial No. 446,927.

*To all whom it may concern:*

Be it known that we, WILHELM ROBERT UGGLA and GUNNAR AUGUST FERDINAND WALLGREN, subjects of the King of Sweden, residing at Kopmangatan 4 and Norra Kyrkogatan 23, respectively, Harnosand, in the Kingdom of Sweden, have invented certain new and useful Improvements in Toothed Wheels, of which the following is a specification.

This invention relates to toothed wheels of that type, in which the teeth are provided on a rim, which is rotatably mounted on a guide, formed by the spokes of the wheel, and is connected with the hub of the wheel by plate springs, so that the rim can yield subjected to sudden loads and the wheel, mounted in a gearing comprising two or a plurality of wheels, may, by rotating the rim, be brought into the proper mesh with the wheel, co-operating with the same. According to the present invention abutments co-operate with the spokes, fitting loosely to the rim, which cooperate with the said plate-springs for positively limiting the relative movement between the rim and the hub of the wheel and thus preventing the springs from being overloaded. Preferably the spokes are rendered somewhat yieldable, so that the interruption of the relative movement between the rim and the hub is effected softly. A further characteristic feature of the invention consists in the toothed rim being movable axially on the spokes carrying the rim. This arrangement is important especially in gearings having two or a plurality of wheels, which are provided with teeth forming an angle with each other, owing to the fact that by shifting the rim peripherically as well as axially the wheels in all pairs of wheels may be brought to mesh properly with each other not only peripherically but also axially, even if there exist faults in the mounting etc.

Figure 1:
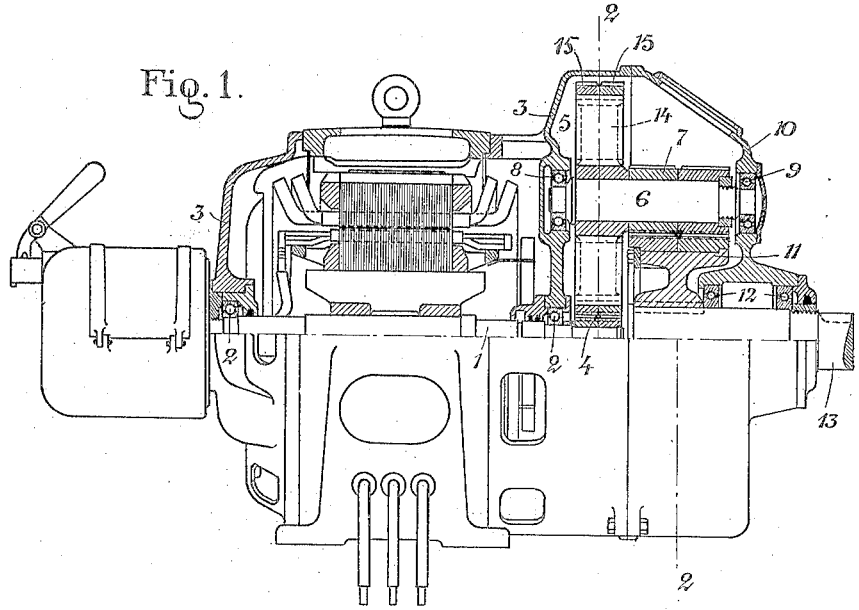
Figure 2:
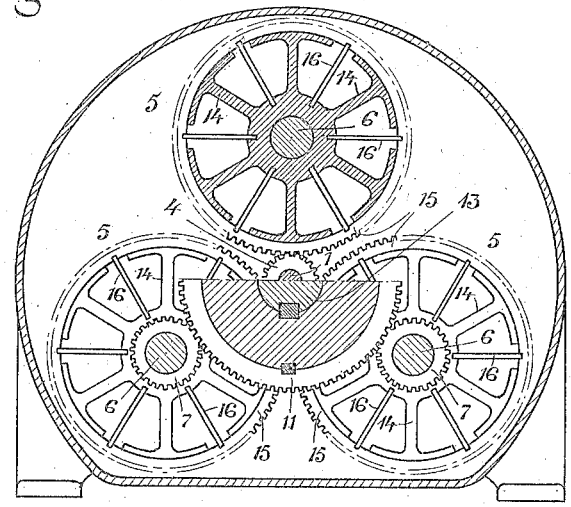

In the accompanying drawing Fig. 1 shows in a longitudinal vertical section, partially in a side view and as an illustration of the applying of the invention, an electric motor, in which a gearing between the driving shaft and the driven shaft is provided, having toothed wheels arranged in accordance with this invention. Fig. 2 is a section on the line 2—2 of Fig. 1. In the gearing shown in the drawing, which gearing is adapted to reduce the number of revolutions and may be used also in turbines and the like, the teeth of the wheels form an angle with each other, which is most suitable in such gearings.

The electric motor is not particularly described, as it may be of any known or suitable construction. 1 is the shaft of the motor, running in ball bearings 2 provided in the frame or casing 3. On the shaft 1 a pinion 4 is fixed provided with angular teeth. Three toothed wheels 5 mesh with the said pinion 4, each being fixed to the same spindles 6 as the pinions 7 respectively. The said spindle 6 is journalled in ball bearings 8 and 9 provided in the frame 3 and a casing 10 fixed to the same. The pinions 7, which also have angular teeth, mesh with a common toothed wheel 11, which is fixed to the driven shaft 13, running in ball bearings 12. The oblique teeth of all the said wheels and pinions respectively are provided on rims separated from one another. In the gearing shown in the drawing the spokes 14 extending from the hubs of the wheels 5 are T-shaped and the rims 15 movable peripherically on the spokes centering the same. The said rims 15 are connected with the hub by plate springs 16, fixed in grooves in the hub and extending at their outer ends freely into grooves provided in the inner side of the rims 15. According to this invention the arms of the T-shaped spokes 14 extend to the vicinity of the springs 16. The distance between the outer ends of the said arms and the springs respectively is so adapted, that the wheels yield only within certain limits. This is of importance in cases, in which overloading of the springs is to be feared. The rims then yield only until the springs 16 strike or come into contact with the arms of the spokes 14. Overload of the springs is thereby fully prevented, for which reason their durability is not jeopardized. Consequently, in the selection of springs regard may be paid only to their capacity of sustaining the normal load. Spokes 14 are preferably rendered somewhat yieldable, so that the arresting of the rims 15, as the springs 16 come into contact with the spokes, is effected softly. The invention may be applied also to toothed wheels having straight teeth provided on a single rim and also to toothed wheels, in which the spokes are connected with the rim and bear loosely on the hub.

If at the mounting of the wheels, during which operation the teeth of the pinions 7 for instance are first fitted to the teeth of the wheel 11 and then the wheels 5 to the pinion 4, the teeth of one or more of the wheels 5 are not in the proper position with relation to the teeth of the pinion 4 peripherically, the rims 15 of the said wheels may, owing to the described arrangement of the wheels 5, be so rotated, that the teeth occupy the proper position peripherically. Owing to the fact, however, that the toothed wheel 5 is fixed to the same shaft 6 as the pinion 7, it may happen that the wheel 5 has not the proper position axially with relation to the pinion 4, for which reason the teeth of the wheel 5 and the pinion 4 do not properly mesh with each other after the said rotation of the rims 15. For the removing of this disadvantage the rims 15 according to this invention are movable axially on the spokes 14 or the guide of the rims. During the axial movement of the rims the springs 16 slide in the grooves provided in the inner side of the rims. The teeth of the rims have such position, that the rims are actuated toward one another by the pressure exerted by the teeth of the wheel co-operating with the same.

Owing to the fact that the rims 15 are shiftable peripherically as well as axially the teeth of the rims 15 may be brought exactly into the proper position with relation to the teeth of the pinion 4. Consequently, all wheels of the gearing may be brought into proper mesh. The wheels then always maintain the proper mesh, even if there exist faults in the manufacturing or other disturbing facts. For that reason the gearing operates exceedingly uniformly without noise and unnecessary wear of the parts. During the operation of the gearing the springs 16 sustain all sudden increasings of the load, so that the gearing operates in a quiet manner. In each of the double gearings 4, 5, 7, 11 the rims of only one of the wheels must be arranged as described.

The invention may, evidently, be modified in some or other respects, without exceeding the limits of the same.

We claim:

1. In a toothed wheel, a hub, spokes extending outwardly from said hub, a rim rotatably mounted on said spokes and provided with slots in the inner side thereof, springs fixed to said hub between said spokes and extending into said slots, and abutments provided on the spokes normally spaced from said springs and cooperating with the springs for positively limiting the relative movemnt between the rim and hub.

2. In a toothed wheel, a hub provided with outwardly extending spokes, a rim rotatably guided by the spokes and provided with axial slots on the inner side thereof, and plate springs firmly connected with the hub and freely extending into said slots, the said slots having such length that the rim may be adjusted axially.

3. In a toothed wheel, a hub, spokes extending from said hub and having oppositely disposed circumferentially extending abutments, a rim rotatably mounted on said spokes and abutments and provided on its inner side with spaced slots, and plate springs arranged between said spokes, extending from said hub and engaging said slots, the outer ends of said springs normally occupying positions midway between and spaced from adjacent abutments.

In testimony whereof we have affixed our signatures in presence of two witnesses.

WILHELM ROBERT UGGLA.
GUNNAR AUGUST FERDINAND WALLGREN.

Witnesses:
 INEZ SWENSON,
 STINA LARSON.